(12) United States Patent
Burroughs

(10) Patent No.: US 6,580,675 B1
(45) Date of Patent: Jun. 17, 2003

(54) LASER DRIVER FOR AN OPTICAL RECORDING SYSTEM

(75) Inventor: Alan C. Burroughs, San Jose, CA (US)

(73) Assignee: Terastor Corporation, San Jose, CA (US)

( * ) Notice: Subject to any disclaimer, the term of this patent is extended or adjusted under 35 U.S.C. 154(b) by 0 days.

(21) Appl. No.: 09/523,096

(22) Filed: Mar. 9, 2000

(51) Int. Cl.⁷ .................................. G11B 7/00
(52) U.S. Cl. .................. 369/116; 369/53.37; 369/53.26
(58) Field of Search .................... 369/116, 59.12, 369/53.26, 53.27, 53.37; 250/205; 372/38.02, 38.07

(56) References Cited

U.S. PATENT DOCUMENTS

| | | | | |
|---|---|---|---|---|
| 5,029,155 A | * | 7/1991 | Kenjo | 369/116 |
| 5,059,780 A | * | 10/1991 | Kakuta et al. | 369/116 |
| 5,175,722 A | * | 12/1992 | Minami et al. | 369/116 |
| 5,355,360 A | * | 10/1994 | Kawashima | 369/116 |
| 6,246,659 B1 | * | 6/2001 | Suzuki et al. | 369/116 |

* cited by examiner

Primary Examiner—Thang V. Tran
(74) Attorney, Agent, or Firm—Fish & Richardson P.C.

(57) ABSTRACT

A laser driver circuit for a light source in an optical recording system to maintain the read current at a substantially constant level. This circuit can reduce a recovery transient time for a transition from the write mode to the read mode.

18 Claims, 3 Drawing Sheets

LASER DRIVER FOR AN OPTICAL RECORDING SYSTEM

BACKGROUND

The present invention relates generally to an optical recording system, and more.particularly, to a laser driver circuit employed in the optical recording system.

Many optical recording systems use a laser beam to record data in an optical medium such as an optical disk and to retrieve recorded data and other information from the optical medium. In general, the laser power to record data and the laser power to retrieve data are different. The power for writing is usually higher than the power for reading. For example, the laser power for writing data on a magneto-optic medium must be sufficient to raise the temperature at a selected spot above the Curie temperature of the medium. Hence, the laser power needs adjustment to an appropriate level when such a system switches between a writing mode and a reading mode.

A laser in an optical recording system may be the type where the output laser power can be electrically controlled. A semiconductor laser is one example of such a laser and is widely used in various optical recording systems. A laser driver circuit is usually coupled to the semiconductor laser to provide a proper driving current and electrical bias to operate the laser. The magnitude of the driving current can be adjusted to change the laser power.

SUMMARY

One embodiment of the invention includes a laser, a photodetector, and a laser driver circuit. The laser produces a laser beam whose power changes in response to a driving signal. The photodetector is coupled to receive a portion of the laser beam to produce a detection signal indicative of the laser power. The laser driver circuit produces the driving signal to the laser. A first signal source is used to produce a first portion of the driving signal and a second signal source Is used to produce a second portion of the driving signal. The laser driver circuit further includes a control circuit to control the second signal source in response to the detection signal to maintain the second portion of said driving signal substantially constant when the first portion of said driving signal changes.

Another embodiment includes a write current source to supply a write current in a write mode and a read circuit to supply a read current in a read mode. A feedforward circuit is connected between the write current source and the read circuit to keep the read current at a substantially constant current level during the write mode.

These and other embodiments can be used in an optical recording system to keep a read laser beam at a substantially constant power level by controlling the read current to the laser, especially when the laser is changed from the write mode to the read mode. Hence, the recovery transient time can be significantly reduced or virtually eliminated.

DETAILED DESCRIPTION

The devices and techniques of this disclosure are in part based on the recognition that certain factors associated with the laser power can adversely affect the performance of an optical recording system. For example, when the system is switched between the writing mode and the reading mode, it may take some transient time to reset the laser power to an appropriate power level for either writing or reading data. During this transient time, the system may not be able to properly write or read data. In an optical disk drive, the disk space that moves through the laser beam during this transient time in the writing mode may be wasted since data may not be properly recorded on the optical disk. In the reading mode, the data recorded in the area that moves through the laser beam during this transient time may be misread or may not be read at all. Hence, it is desirable to control the driving current to the laser in a way that the transient time is substantially reduced or minimized.

In addition, the laser power may also vary at a given driving current in either writing or reading mode due to a number of factors. For example, the temperature of the laser can change by, e.g., temperature variation in the environment or the heating of driving current in the laser. This change in the laser temperature hence can change the laser output power. Aging of the laser may also cause the laser power at a fixed driving current to vary over time. Such power variations can adversely affect the performance of the system.

One aspect of the present disclosure includes a laser driver circuit connected to the laser of the optical recording system to control the laser driving current so that the laser power is maintained at a desired constant level. The driving current is a sum of a write current from a write current source and a read current from a read current source. During the write mode, the currents from both current sources are used to drive the laser at a high power level to write data. In the read mode, the write current is switched off from the laser so that only the read current drives the laser. A photodetector is provided to receive a portion of the output laser power and to produce an electrical monitor signal indicative of the laser power. The laser driver circuit also includes a current sensor to sense the write current. A feedforward circuit then uses the outputs from the current sensor and the photodetector to control the read current source so that the read current is substantially constant and the transient time from the write mode to the read mode is reduced.

Figure 1:
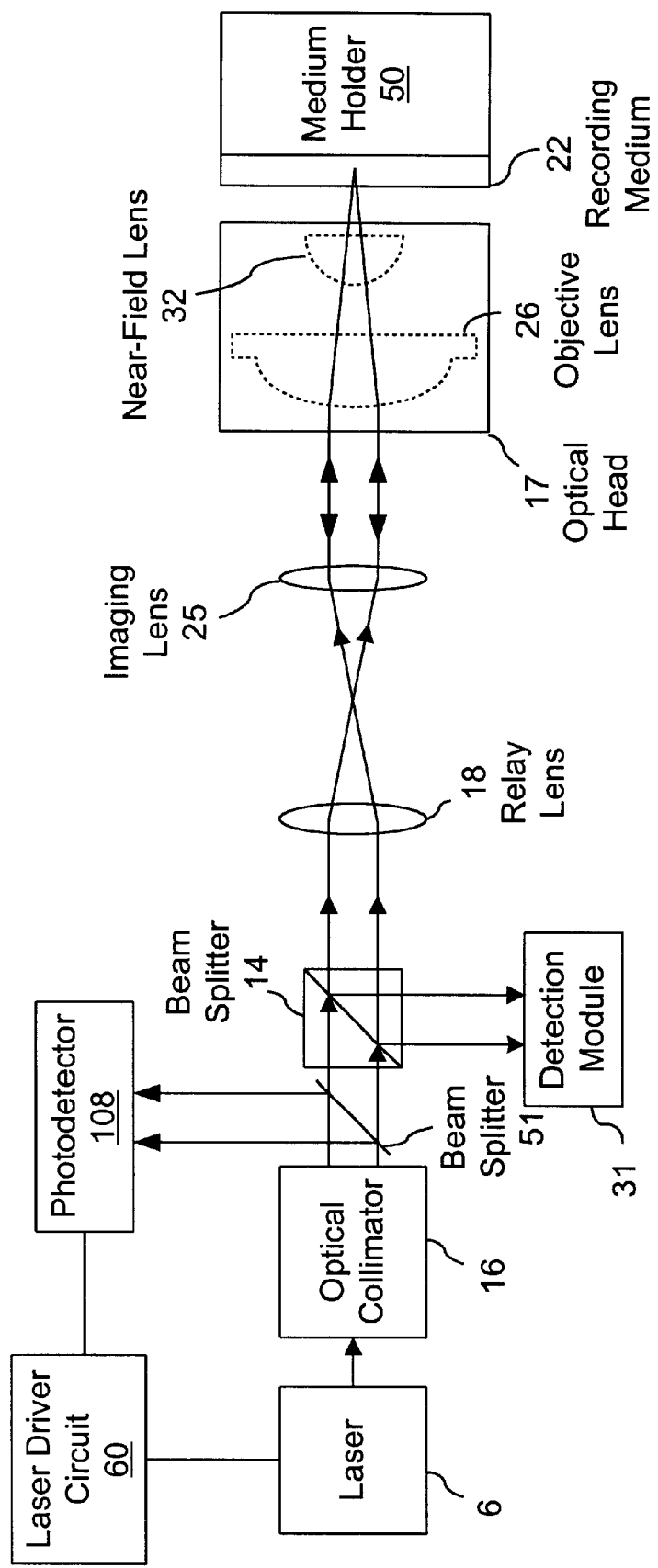
FIG. 1 illustrates a simplified optical recording system including a laser driver circuit according to one embodiment.

FIG. 1 shows a simplified optical recording system 10 having a laser driver circuit 60 according to one in one embodiment. A laser 6, such as a diode laser, produces an optical beam for recording and retrieving data from an optical medium 22 that is held by a medium holder 50. The optical medium 22 may be, for example, an optical disk driven by a spindle motor. The optical medium 22 is configured to include a recording layer for data storage. A magneto-optical material or a phase-change material may be used as the medium 22.

The optical beam from the laser 6 is collimated-by an optical collimator 16 and then projected to an optical head 17 by a relay lens 18 and an imaging lens 25. The optical head 17 has an objective lens 26 and a near field-lens 32 to couple the beam to the optical medium 22. The near-field lens 32 may be formed from a high-index optical material. This can produce a large effective numerical aperture ("NA"), i.e., NA=n sin $\theta_0$, where n is the refractive index of the near-field lens 22 and $\theta_0$ is the maximum ray angle from the lens 32 to the focus point. For example, the lens 32 may be a solid immersion lens ("SIL").

The system 10 may be operated in either a near-field or far-field configuration. In the near-field configuration, the near-field lens 32 and the optical medium 22 are spaced from each other by an air gap less than one wavelength of the light produced by the laser 6. Optical energy can be coupled between the near-field lens 32 and the optical medium 22 at least in part by evanescent waves.through the air gap. Light propagation through the air gap may also be combined with the evanescent waves to provide energy coupling. In the far-field configuration, the air gap between the near-field lens 32 and the optical medium 22 is greater than one wavelength of the light so that the light is coupled by wave propagation.

A beam splitter 14 is used to guide a reflective beam from the optical medium 22 to a detection module 31 for data extraction and beam tracking. Certain implementations of the optical train 1 in FIG. 1 and its operation are described in U.S. patent application Ser. No. 08/846,916 filed on Apr. 29, 1997.

The laser driver circuit 60 is coupled to produce a driving current ($I_{Laser}$) to drive the laser 6. The driving current $I_{Laser}$ can be adjusted either to a desired high value during the write mode or to a desired low value during the read mode. In the write mode, the high driving current allows the laser 6 to produce a sufficient high laser power to change the state of the illuminated spot and hence to write data in the medium 22. In the read mode, the driving current $I_{Laser}$ is low so that the heating caused by the laser power does not change the state of the illuminated spot in the medium 22 so the data in that spot is not affected by the reading. However, the low value is set to have a sufficient laser power to achieve a desired signal-to-noise ratio for the readout.

A photodetector 108 is used to monitor the laser power from the laser 6 by producing an electrical monitor signal. A beam splitter 51, for example, can be disposed in an optical path of the laser beam output from the laser 6 to direct a small portion of the laser beam into the photodetector 108. The laser driver circuit 60 produces and adjusts the driving current $I_{Laser}$ to the laser 6 in response to the monitor signal from the photodetector 108.

Figure 2:
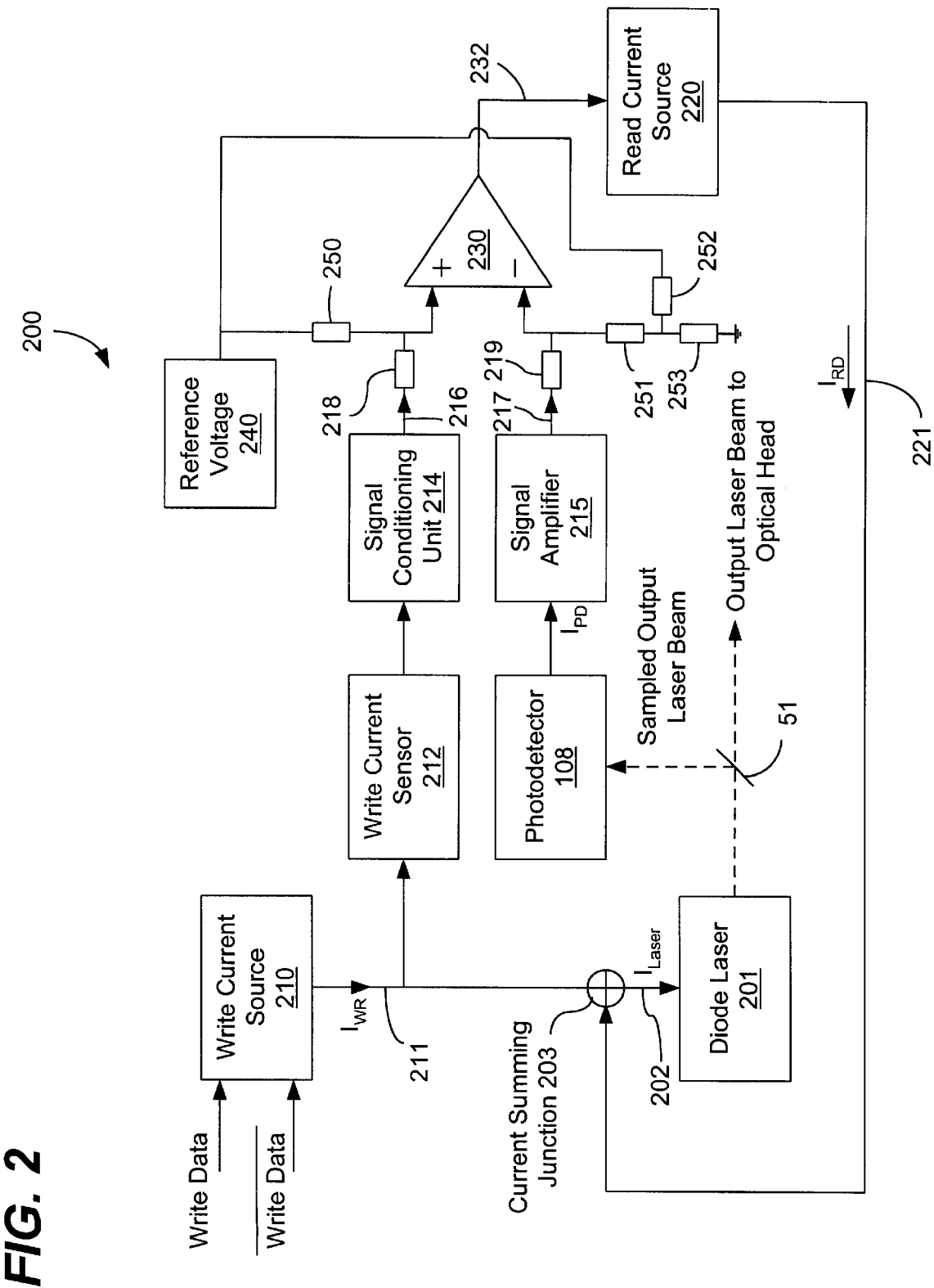
FIG. 2 illustrates a circuit diagram of the laser driver circuit of FIG. 1.

FIG. 2 shows a block diagram of one embodiment 200 of the laser driver circuit 60 shown in FIG. 1. The circuit 200 includes a write current source 210 and a read current source 220 to supply a driving current 202 ($I_{Laser}$) to a diode laser 201. The write current source 210 is controlled to produce the write current 211 during the write mode so that the driving current 202 is a sum of a write current 211 ($I_{WR}$) produced by the source 210 and a read current 221 ($I_{RD}$) produced by the source 220. During the read mode, the write current source 210 is controlled to turn off the write current $I_{WR}$ and hence the driving current 202 is essentially equal to the read current.

The laser driver circuit 200 implements a feedforward mechanism to maintain the read current 221 substantially constant at all times so that the transition time from the write mode to the read mode is essentially eliminated. The photodetector 108 converts a sampled laser output of the laser 201 in an electrical signal which is amplified by an amplifier 215 to produce a signal 217. A write current sensor 212 is used to sample the write current 211 from the source 210. The output of the photodetector 108 is also combined to the output of the current sensor 212 as input to the conditioning unit 214. The unit 214 filters and amplifies the combined input to produce the signal 216.

An operation amplifier 230 is coupled to receive the signals 216 and 217 through DC bias resistors 218 and 219, respectively, at its non-inverting and inverting input terminals to produce an output signal 232. The input terminals of the amplifier 230 are biased by a reference voltage 240 through resistors 250, 251, 252, and 253. The output signal 232 controls the read current source 220 to maintain the read current 221 substantially constant in both the read and write modes. When the write current 211 is switched off, the driving current 202 to the laser 201 is the read current 221 at the desired value based on the bias voltage to the inverting input set by the resistors 251, 252, and 253. Hence, the laser output power is at the desired read power. The transition time is thus substantially eliminated. In addition, this feedforward mechanism also keeps read current constant against slow change parameters, such as temperature, aging of the laser 201, and others, so that the output power of the laser 201 in the read mode remains unchanged.

Figure 3:
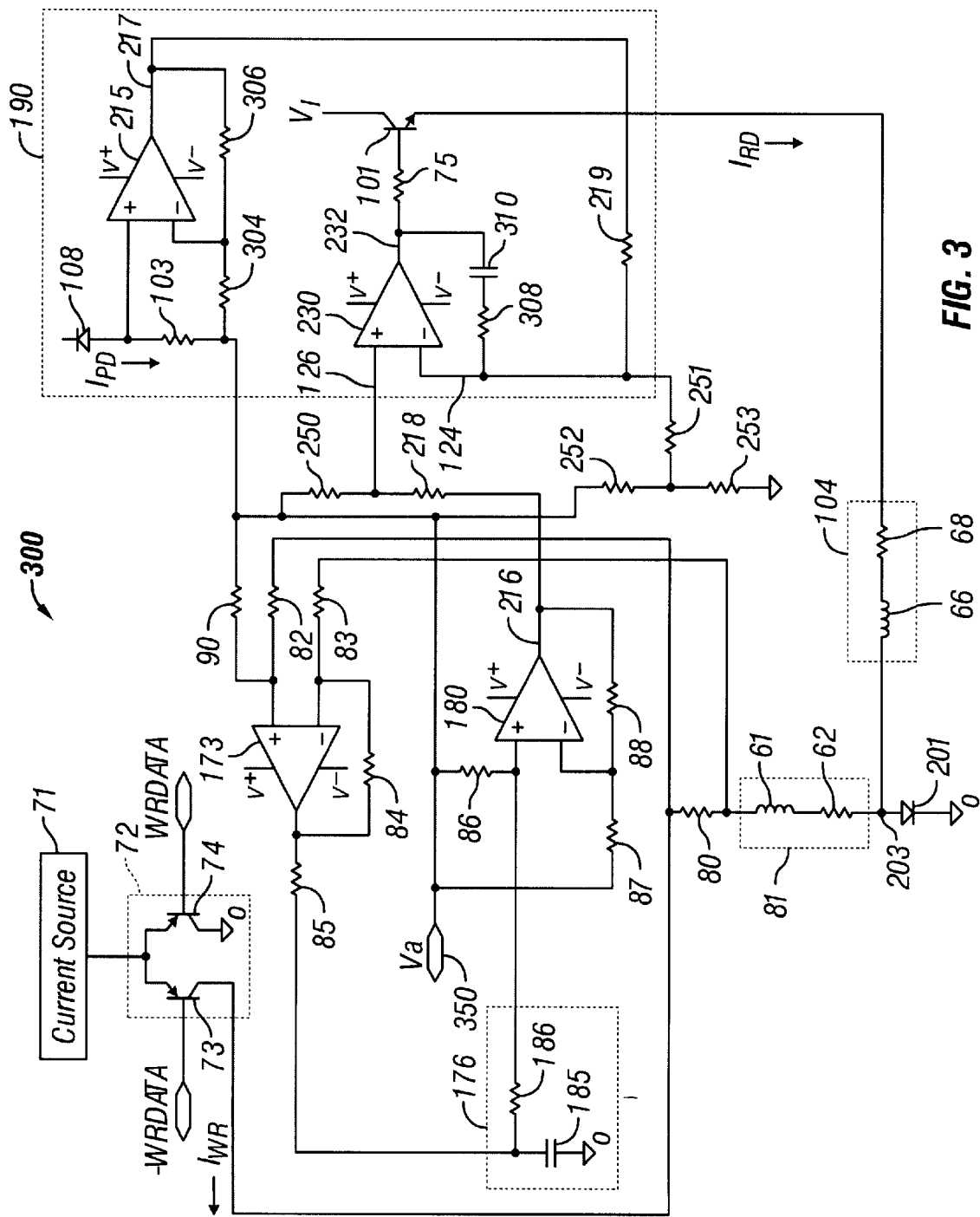
FIG. 3 shows one implementation of the laser driver circuit in FIG. 2.

FIG. 3 illustrates one implementation 300 of the laser driver circuit 200 in FIG. 2. The write current source 210 of FIG. 2 is represented by a current source 71 and a current switch 72. The current switch 72 operates in response to an external control signal WRDATA. When WRDATA is low, for example, the switch 72 is turned on to sent the write current to the laser 201. When WRDATA is high, the switch 71 shuts off the write current. In the example shown, the switch 71 includes a pair of pnp transistors 73 and 74. Their emitters are shorted to receive the write current from the source 71. The base of the transistor 73 is coupled to receive the complementary signal of WRDATA while the base of the transistor 74 is coupled to receive the signal WRDATA. The collector of the transistor 73 serves as the output of the switch 72 and outputs the write current when the switch 72 is on. The collector of the transistor 74 is grounded to drain the write current when the switch 72 is off. Hence, when WRDATA is low, the transistor 73 is on and becomes conductive while the transistor 74 is off, and vice versa when the WRDATA is high. Of course, other transistors may be used, such as npn transistors. The transistors may be the bipolar type or field effect type.

A resistor 80 is coupled between the switch 72 and the laser 201 to function as the write current sensor 212 in FIG. 2. During a write mode, the write current is converted into a voltage by the resistor 80. An amplifier 173, a low-pass filter 176, and another amplifier 180 are connected in series to function as the conditioning unit 214 in FIG. 2 to produce a voltage representing the write current at the non-inverting input of the amplifier 230.

The laser driver circuit 300 includes a read current loop 190 to produce the read current. A transistor 101 is implemented as the read current source 220 shown in FIG. 2. In general, the transistor 101 may be of any type, including the bipolar and the field effect transistors. The collector or drain of the transistor 101 is provided with a voltage $V_b$, which may be about 5 volts. The gate or base of the transistor 101 is coupled through a resistor 75 to receive the output control signal 232 from the amplifier 230.

The photocurrent from the photodetector 215 is converted into a voltage by a resistor 103. The amplifier 215 then amplifies this voltage to produce the output 217 to the inverting input of the amplifier 230. Resistors 304 and 306 can be used to set the gain for the amplifier 215. The amplifier 230 also includes a feedback loop with a resistor 308 and a capacitor 310 to set the bandwidth of the amplifier 215 and hence the bandwidth for the entire read loop 190. A suitable bandwidth may be about 1 megahertz. In this configuration, the output from the emitter or source of the transistor 101, and thus the read current $I_{RD}$, are controlled by the input signal 217. The read current and the associated read power may also be varied by adjusting the value of the resistor 103.

A reference voltage 350 ($V_a$) is provided to function as the reference voltage 240 in FIG. 2. The amplifiers 172 and 180 are properly biased at their input terminals through resistors 90, 86, and 87 that are coupled to the reference voltage 350. The inputs of the amplifier 230 are biased by the reference voltage 350 through resistor 250 and a voltage divider formed by resistors 251, 252, and 253, respectively.

In a write mode, the output voltage of the amplifier 173 can be configured to be proportional to the write current $I_{WR}$. The output of the amplifier 173 is then fed through the low-pass filter 176, which includes a capacitor 185 and a resistor 186. The output of the low-pass filter 176 is then further amplified by an amplifier 180. The output 216 of the amplifier 180 is passed to the non-inverting input 126 of the amplifier 125 via the resistor 218. The amplifier 230 operates to force inputs to be at substantially the same potential, independent of the current supplied by the transistor 73.

Hence, the read current from the transistor 101 is kept substantially constant during a write operation. Accordingly, when the laser driver circuit 300 switches from the write mode to the read mode by turning off the transistor 73, the read current from transistor 101 essentially stays unchanged. Substantially no recovery transient time will occur, when the write mode is terminated.

The laser driver circuit 300 may also include two impedance circuits 81 and 104 at the summing node 203 of the read current and the write current. Each impedance circuit includes a resistor (62 or 68) and an inductor (61 or 66) to reject certain high frequency components from the diode laser 201 to affect other parts of the laser driver circuit 300. The impedance circuits 81 and 104 are particularly useful when the diode laser 201 is electrically modulated at a high RF frequency to stabilize the output laser power. In addition, the laser driver circuit 60 may include a voltage $V_a$ to bias the amplifiers 173, 180, 215, and 230 to operate in a linear mode.

An example configuration for the laser driver circuit 60 is as follows. The values of the various components of the laser driver circuit 300 shown in FIG. 3 are listed below in Table 1. The above configuration can set the read power level of the diode laser 201 between about 0 and 2 mW. The voltages $V_a$ and $V_b$ may be 2.25 volts and 5 volts, respectively.

The above laser driver circuits can be used to minimize the recovery transient time between a write mode and a read mode. Hence, disk space is not lost during a transition from the write mode to the read mode because the read power is at the desired level when the write mode is terminated. The above laser driver circuits also allow the laser source to operate over varying temperatures and to compensate for laser aging. This is because the read current loop 190 formed by the photo sensor 108, the amplifiers 230 and 250, and the transistor 101 is always a closed loop, independent of reading or writing data. The laser driver circuits can also compensate for changes in temperature.

TABLE 1

| Resistors | | | |
|---|---|---|---|
| 62 | 30 ohms | 87 | 1,000 ohms |
| 68 | 40 ohms | 88 | 10,000 ohms |
| 306 | 1,000 ohms | 250 | 10,000 ohms |
| 304 | 3,000 ohms | 90 | 6,000 ohms |
| 308 | 100 ohms | 103 | 100 ohms |
| 75 | 100 ohms | 186 | 50,000 ohms |
| 82 | 2,000 ohms | 253 | 1,000 ohms |
| 83 | 2,000 ohms | 252 | 1,000 ohms |
| 84 | 4,000 ohms | 251 | 50,000 ohms |
| 85 | 1,000 ohms | 218 | 5,000 ohms |
| 86 | 5,000 ohms | | |
| Capacitors | | | |
| 310 | 30 picofarad | 185 | 270 picofarad |
| Inductors | | | |
| 61 | 22 nanohenry | 66 | 100 nanohenry |

Although a few embodiments have been described, it should be understood that various modifications and enhancements can be made.

What is claimed is:

1. A device, comprising:
   a laser to produce a laser beam whose power changes in response to a driving signal;
   a photodetector coupled to receive a portion of said laser beam to produce a detection signal indicative of said power; and
   a laser driver circuit to produce said driving signal to said laser, said laser driver circuit having a first signal source to produce a first portion of said driving signal, a second signal source to produce a second portion of said driving signal, and a control circuit to control said second signal source in response to said detection signal to maintain said second portion of said driving signal substantially constant when said first portion of said driving signal changes,
   wherein said control circuit includes an amplifier having a first input to receive a first input signal representing said first portion of said driving signal and a second input to receive a second input signal representing said detection signal, said amplifier operable to produce a control signal that controls said second signal source.

2. A device as in claim 1, wherein said control circuit further includes a voltage reference source to bias said first and said second inputs of said amplifier.

3. A device as in claim 1, wherein said control circuit includes a signal sensor to sample said first portion produced by said first signal source, and a signal conditioning circuit to amplify a low frequency part of an output of said signal sensor to produce said first input signal.

4. A device as in claim 3, wherein said signal conditioning circuit includes a low pass filter and at lease one amplifier.

5. A device as in claim 1, further comprising an optical head to couple said laser.beam from said laser to an optical storage medium.

6. A device, comprising:
   a write current source to produce a write current in response to a write control signal;
   a read current source to produce a read current in response to a read control signal;
   a current summing junction to sum said write and said read currents to produce a laser driving current;
   a laser to respond to said laser driving current to produce a read laser beam when said write current is turned off and a write laser beam when said write current is on;
   a photodetector to sample an output of said laser to produce a first signal indicating output power of said laser;

a current sensor to sample said write current to produce a second signal indicating said write current; and an amplifier having a first input to receive said first signal and a second input to receive said second signal to produce said read control signal that is substantially constant when said laser changes from producing said write current to producing said read current.

7. A device as in claim 6, further comprising:

a first amplifier to amplify said first signal;

a low pass filter to remove at least a high frequency component from said first signal amplified by said first amplifier;

a second amplifier coupled between said low pass filter and said amplifier to amplify said first signal; and a third amplifier coupled between said photodetector and said amplifier to amplify said second signal.

8. A device as in claim 6, further comprising a reference voltage source coupled to bias said first and said second inputs of said amplifier.

9. A device as in claim 6, wherein said write current source includes a current source and a switch coupled to turn on and off said write current in response to said write control signal.

10. A device as in claim 6, wherein said read current source includes a transistor.

11. A device as in claim 10, wherein said transistor has a base coupled to receive said read control signal, a collector coupled to a reference voltage, and an emitter to produce said read current.

12. A device, comprising:

a laser diode to receive and to respond to a write current and a read current to produce a laser output;

a write current source to supply said write current in a write mode;

a read circuit to supply said read current in a read node; and a feedforward circuit connected between the write current source and the read circuit to keep the read current at a substantially constant current level during the write mode, wherein said feedforward circuit further includes:

a photo sensor to receive a portion of said laser output to monitor said laser diodes a first amplifier circuit responsive to a first input from the photo sensor;

a second amplifier circuit responsive to a second input from the first amplifier circuit.

13. A device as in claim 12, wherein said feedforward circuit includes a sensor to use a portion of the write current to control the read circuit during the write mode.

14. A device as in claim 12, wherein said feedforward circuit includes a photo sensor to receive a portion of said laser output to produce said second input to said amplifier.

15. A method, comprising:

coupling a laser driver crcuit to a laser in an optical storage system to deliver a read current to the laser during a read mode and to deliver a write current to the laser in addition to the read current during a write mode;

using a photodetector to sample an output of the laser to produce a first signal;

producing a second signal to represent the magnitude of the write current; and using the first and second signals to maintain the read current substantially constant during the write mode and the read mode, wherein the first and second signals are fed into an inverting and a non-inverting inputs of an operational amplifier to produce a control signal which controls the read current.

16. A method as in claim 15, further comprising using a reference signal to produce the second signal during the read mode when the write current is turned off.

17. A device, comprising:

a laser diode to receive and to respond to a write current and a read current to produce a laser output;

a write current source to supply said write current in a write mode;

a read circuit to supply said read current in a read mode in response to a read control signal; and a feedforward circuit connected between said write current source and said read circuit to keep the read current at a substantially constant current level during the write mode, said feedforward circuit comprising an amplifier having a first input to receive a first signal representing a level of said write current and a second input to receive a second signal representing a level of said laser output to produce said read control signal that is substantially constant when said laser diode changes from the write mode to the read mode.

18. A device as in claim 17, wherein said feedforward circuit includes a sensor to use a portion of the write current to control the read circuit during the write mode.

* * * * *